United States Patent
Badger et al.

[11] Patent Number: 5,935,536
[45] Date of Patent: Aug. 10, 1999

[54] RECOVERY OF RECYCLED PLASTICS IN GRANULAR FORM

[76] Inventors: Berkley C. Badger, 324 Westgate Rd., Tarpon Springs, Fla. 34689; Kevin E. Hissem, 1333 Brunnell Parkway, Lakeland, Fla. 33805; David E. Jones, 630 Drake La., Dunedin, Fla. 34698

[21] Appl. No.: 09/007,110

[22] Filed: Jan. 14, 1998

Related U.S. Application Data

[63] Continuation of application No. 08/818,953, Mar. 14, 1997, abandoned.

[51] Int. Cl.$^6$ ........................................................ B01D 11/02
[52] U.S. Cl. ........................... 422/280; 422/281; 422/284; 422/286; 422/901; 241/DIG. 38; 521/40; 264/920; 425/74; 425/75; 425/223
[58] Field of Search ...................................... 422/255, 261, 422/280, 281, 284, 286, 901; 241/DIG. 38; 521/40; 264/DIG. 69, 920; 425/74, 75, 223

[56] References Cited

U.S. PATENT DOCUMENTS

| | | | |
|---|---|---|---|
| 3,912,664 | 10/1975 | Wainer | 528/495 |
| 4,038,219 | 7/1977 | Boehm et al. | 260/2.3 |
| 4,164,484 | 8/1979 | Tokuda et al. | 260/2.3 |
| 4,517,312 | 5/1985 | Kumasaka et al. | 521/47 |
| 4,996,265 | 2/1991 | Okubo et al. | 525/242 |
| 5,270,445 | 12/1993 | Hou | 528/502 |
| 5,279,465 | 1/1994 | Stroppiana | 241/29 |
| 5,300,267 | 4/1994 | Moore | 422/286 |
| 5,350,562 | 9/1994 | Anthony | 422/1 |
| 5,411,714 | 5/1995 | Wu et al. | 422/232 |
| 5,540,244 | 7/1996 | Brooks et al. | 134/56 R |
| 5,567,769 | 10/1996 | Shine et al. | 525/63 |
| 5,583,166 | 12/1996 | Okamoto et al. | 523/340 |
| 5,594,035 | 1/1997 | Walsh | 521/47 |
| 5,674,914 | 10/1997 | Abe et al. | 422/901 |

*Primary Examiner*—Krisanne Thornton
*Assistant Examiner*—Fariborz Moazzam
*Attorney, Agent, or Firm*—Terrance L. Siemens

[57] ABSTRACT

Apparatus and method for reclaiming expanded synthetic resin wastes in a form suitable for subsequent injection molding. The apparatus includes a tank containing a solvent having a pump for pumping dissolved resin wastes to an evaporator. The evaporator comprises an endless belt on which dissolved resin waste is deposited and precipitates in the form of a thin film. A heater is disposed below the belt to expedite separation of solute and solvent by evaporation. A blower disposed within a housing enclosing the endless belt establishes air circulation over the belt, further promoting evaporation. The thin film is wound on a roller and subjected to a heated roller to fuse the many thin film strata into a solid, generally cylindrical mass. The solid mass is then comminuted by a granulator. Evaporated solvent is recovered in a condenser and is reused.

6 Claims, 2 Drawing Sheets

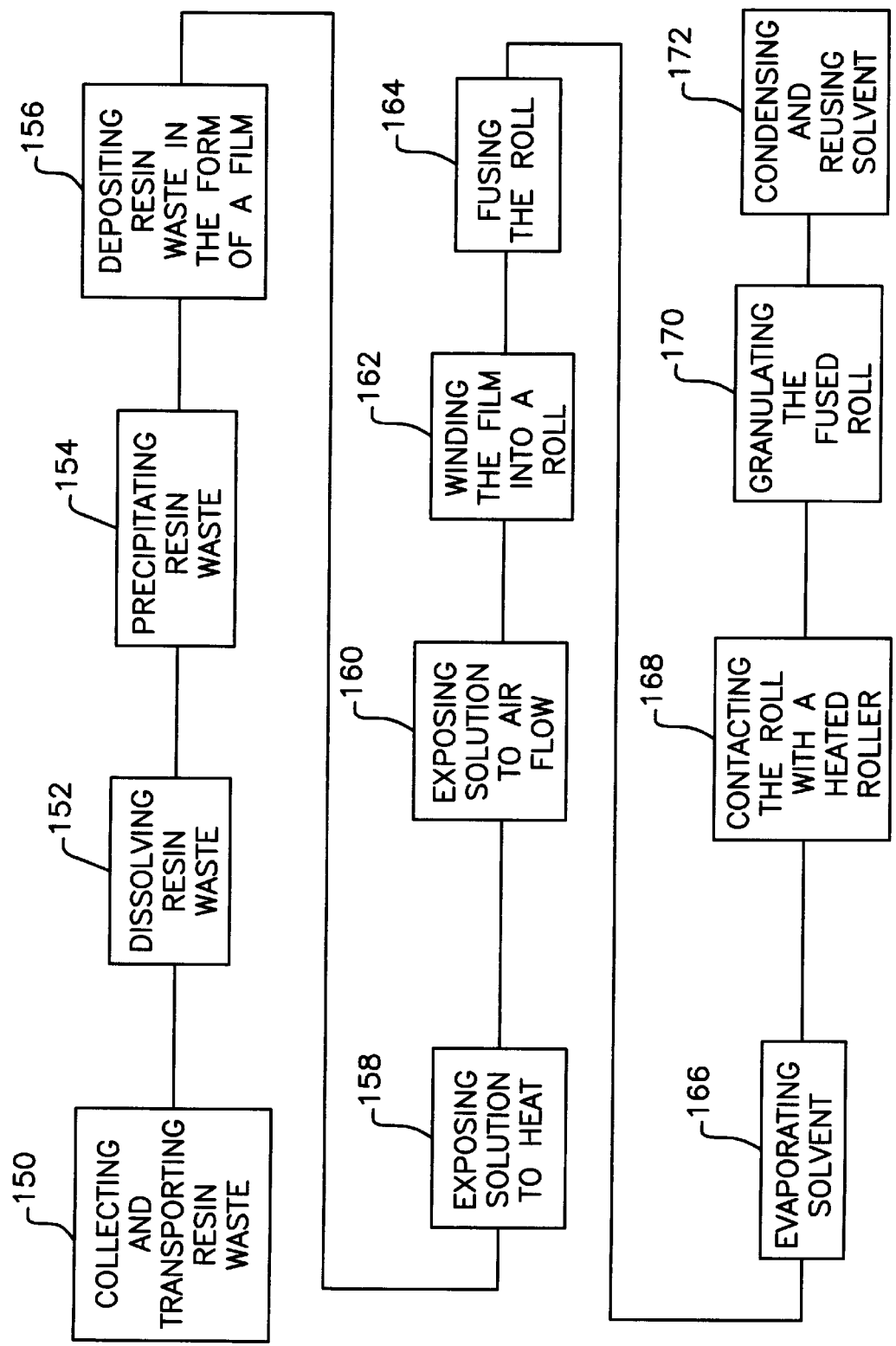

5,935,536

RECOVERY OF RECYCLED PLASTICS IN GRANULAR FORM

REFERENCE TO RELATED APPLICATION

This is a Continuing patent application of Ser. No. 08/818,953, filed Mar. 14, 1997 now abandoned.

BACKGROUND OF THE INVENTION

1. Field of the Invention

The present invention relates to recovery of immediately reusable polymers and elastomers in a form having characteristics of virgin material from recycled scrap, in a granular form particularly suitable for conveying.

2. Description of the Prior Art

Synthetic polymeric and elastomeric resins are widely utilized for fabricating packaging and packing products. When objects and materials contained in such products are utilized, the packaging and packing products are discarded. If these products are merely disposed in landfills, they are lost for subsequent recovery of the constituent material. Furthermore, disposal in landfills is objectionable since such products, as is typical with synthetic resins generally, are of low density and occupy inordinate volume within a landfill.

To achieve recovery of the constituent materials and to avoid rapid filling of available landfill facilities, it is preferred to recycle the material. However, mere comminution of recovered synthetic resin or plastic scrap does not result in a product suitable for immediate reuse. Comminuted waste requires blending with sixty to eighty percent virgin resin to assure that the resultant raw material will be satisfactory. This process produces acceptable results, but relies heavily upon a source of virgin material. No good process has heretofore been developed which avoids reliance upon virgin material.

One of the problems that attends reclamation of synthetic resins is that even should the recovered material be of suitable constituency from a chemical standpoint, its physical configuration may not be readily suitable for transport and conveyance. Illustratively, flakes, strips, and other particle configurations are prone to build up in tubular conduits, particularly where diameters change, and in other mechanical transporting systems. A build up may occur, obstructing the conduit and bringing a recovery process to a halt.

Recovery or separation of plastics from waste has relied upon many methods. Recycling of plastic films is featured in U.S. Pat. No. 5,540,244, issued to J. Douglas Brooks et al. on Jul. 30, 1996. Brooks et al. roll or extrude recovered materials in the form of flakes into pellets. By contrast, the present invention precipitates recovered material in web form, rolls the web in to a cylinder, and fuses the cylinder into a solid mass, prior to grinding the same.

U.S. Pat. No. 5,350,662, issued to Fernando Stroppiana on Jan. 18, 1994, describes a process in which sheets are formed by extrusion and subsequently reduced to granules and fibers by shaving. By contrast, in the present invention, sheets are formed by precipitation on a heated belt. The sheets are fused into a solid mass, prior to grinding the same.

None of the above inventions and patents, taken either singly or in combination, is seen to describe the instant invention as claimed.

SUMMARY OF THE INVENTION

The present invention recovers synthetic resins, notably expanded polystyrene and like substances, from post consumer and post industrial wastes. Typical waste streams arise from manually separated commercial and institutional sources, and from industrial plants. The resin is utilized after reclamation in injection molding in unexpanded form. In the invention, the resins are dissolved in a solvent and subsequently precipitated in solid form in a manner readily suitable for transporting or conveying of the recovered resins. The resins are deposited on a moving belt. The solvent is evaporated by a combination of heat and mild vacuum. The resins form a film which is wound into a roll. The solvent is condensed and recirculated.

The roll of film is fused into a solid mass by a heated roller or by any other suitable method of fusing the wound roll. This solid mass, which assumes outer configuration of a cylinder, is then introduced into a mechanical comminutor, such as one having blades. This process results in the comminuted particles having an important quality of a sphere. That is, diameters taken at various points through the interior of the particles generally exhibit constant or nearly constant magnitude. Although the surface does not form a sphere, the resultant particles are able to roll when being transported in tubes, augers, and other closed mechanical transporting systems widely employed in injection molding.

The novel process has several advantages in addition to assisting in transport. One is that the ratio of surface area to mass is minimized, thereby discouraging oxidation. This has the effect of maintaining strength of the resin. Another is that high molecular density is encouraged. This increases efficiency in handling resins.

Accordingly, it is one object of the invention to recover expanded synthetic resin wastes for reuse.

It is another object of the invention to assure high purity in the recovered resin.

It is a further object of the invention to minimize oxidation during the recovery process.

Still another object of the invention is to maximize density of the recovered product.

An additional object of the invention is to produce reconstituted resins in a granular form promoting free flowing in conduits and other conveyance systems.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 2 is a block diagram summarizing steps of carrying out a method of practicing the invention, and is read from the upper left to the lower right.

DETAILED DESCRIPTION OF THE PREFERRED EMBODIMENTS

Figure 1:
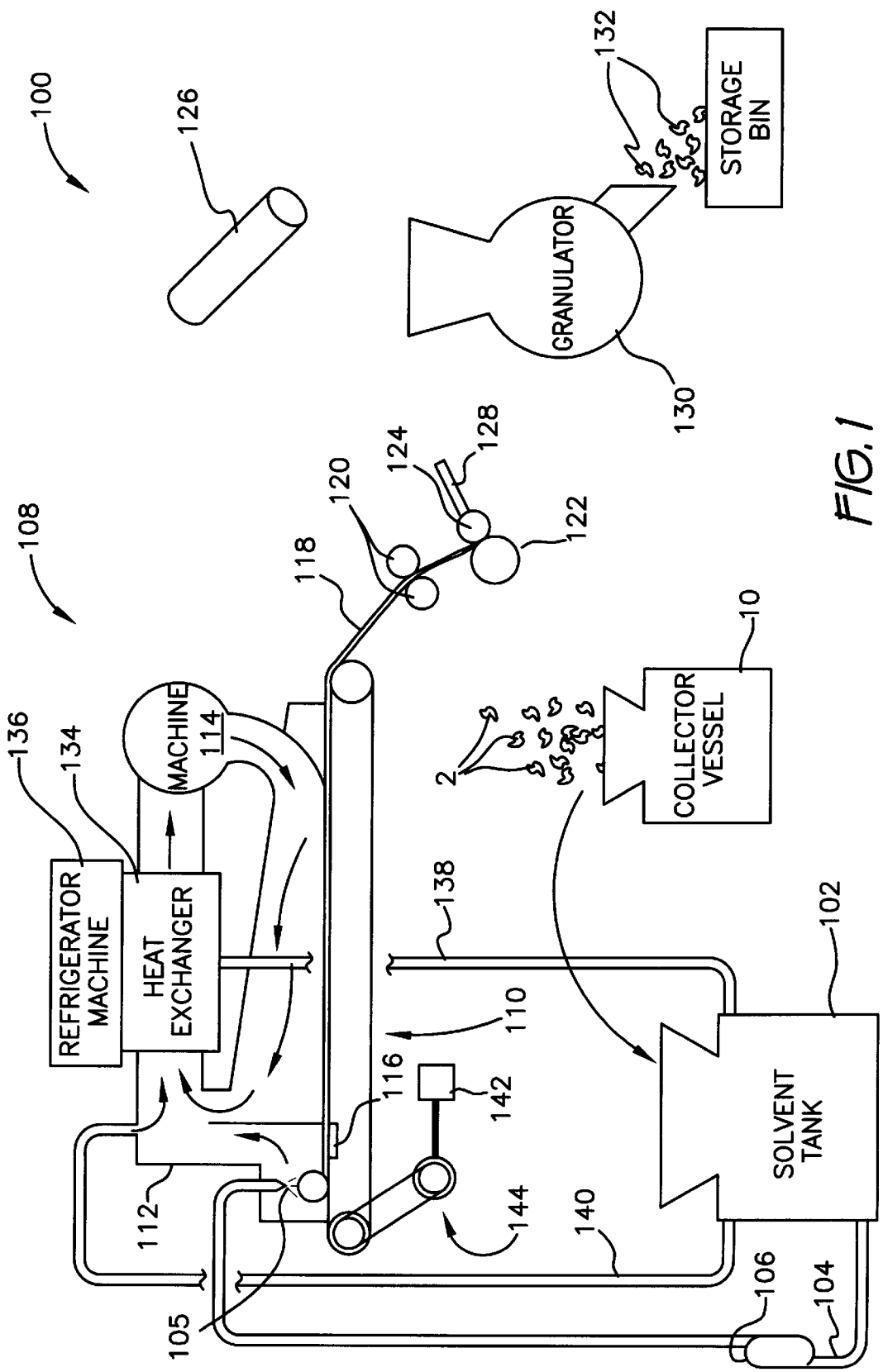
FIG. 1 is a diagrammatic representation of the apparatus of the invention.

The apparatus for reclaiming expanded synthetic resin wastes is shown in FIG. 1. In commercial practice, a portable collector vessel 10 is employed at source sites (not shown) of the wastes, such as institutional or commercial premises where expanded polystyrene and like resins are separated from other materials, and industrial facilities generating wastes. The expanded resin waste 2 is dissolved in a suitable solvent in vessel 10 sufficiently to render it compact, compared to the expanded state. The solution thus obtained is subsequently transported from each source site to a remote processing facility. This arrangement allows wastes to be collected at many sites and processed for reclamation at a facility devoted specifically to that end. It would not be economical to provide a processing facility at each point of collection of wastes.

The processing facility has the following novel apparatus 100. A tank 102 is partially filled with solvent. Solution from collector vessel 10 is discharged into tank 102, thereby diluting the dissolved resin waste with additional solvent. The solvent is the same type as that originally employed to dissolve expanded resin waste 2 in collector vessel 10. Preferred solvents include tetrachloroethylene and trichloroethylene, which are not flammable and also are quite dense. Dilute solution is conducted through a conduit 104 under force from a pump 106 to a precipitator 108. Precipitator 108 includes an endless belt 110 and associated supporting rollers enclosed in a housing 112. Belt 110 is preferably a glass top belt coated with polytetrafluoroethylene. Conduit 104 terminates within precipitator housing 112 in a nozzle 105 located over endless belt 110.

Two evaporators are provided to expedite deposition and drying of precipitated resin. One is a centrifugal blower 114 disposed within housing 112 and arranged to circulate air over endless belt 110. Air circulation is indicated by arrows. The other evaporator is an electrical resistance heater 116 disposed in heat exchange relationship to belt 110.

As solvent evaporates under the influence of heat from heater 116 and air circulation, precipitated resin forms a thin film 118. Film 118 is drawn by two pulling rollers 120 out from housing 112. Film 118 is wound into a roll 122. As roll 122 is formed, a heated roller 124 heated by an electrical resistive element (not shown) or any other suitable heat source bears against roll 122, thereby thermally fusing roll 122 into a generally cylindrical solid mass 126. Roller 124 is supported on a pivot arm 128 to enable rolling contact with roll 122.

Cylindrical solid mass 126 is then introduced into a generally conventional granulator 130, which comminutes mass 126 into granules 132. Granules 132 are recovered resins in a dense form suitable for injection molding. Their nearly spherical overall configuration enables them to flow freely throughout conduits (not shown) employed in injection molding systems.

The solvent is constantly recirculated in a closed cycle. After being separated by evaporation from the resin, the solvent is drawn by suction of blower 114 through a heat exchanger 134 disposed in heat exchange relationship with air circulated over belt 110. A conventional vapor compression type refrigeration machine 136 having a chilling circuit (not separately shown) cools heat exchanger 134, thereby condensing solvent from the vapor state. Condensed solvent is returned to tank 102 through a conduit 138.

A conduit 140 communicates between the upper portion of tank 102 and a portion of the interior of housing 112 subject to suction from blower 114. This arrangement assists in preventing loss of solvent when a fresh supply of resin and solvent solution is being introduced from collector vessel 10.

Process rates are optimized in part by controlling speed of belt 110. Speed is controlled by a variable speed drive 142 which controls motor 144 driving belt 110 by a pulley system 144. Drive 142 may be a variable frequency controller, a variable voltage controller, or any other suitable controller for controlling motor speed.

Although the invention has been set forth in terms of apparatus 100, it may also be practiced by providing any apparatus which effects the following method. Referring now to FIG. 2, resin wastes are collected at a source of resin wastes and are transported to a processing facility in a first step 150. At the processing facility, the wastes are dissolved to a final, predetermined concentration in solvent, this being represented by step 152. The resin is then separated from solvent by precipitation, as shown in step 154. More particularly, the resin is deposited in the form of a thin film, as shown in step 156.

As the film forms, solvent is evaporated to expedite precipitation. This is represented by step 158. In steps 160 and 162 respectively, evaporation is accomplished by exposing the solution to heat and to air flow. In a subsequent step 164, the film is wound into a roll. The roll is then fused step 166. Fusing is preferably accomplished by contacting the roll with a heated roller, as shown in step 168. Although contact by heated roller 124 has proved efficacious in this capacity, fusing may be accomplished in other ways, such as hot air blast, ultrasonic welding, or in any effective manner. The fused roll is then granulated, as indicated by step 170.

To prevent loss of solvent for economic and environmental reasons, evaporated solvent is condensed and reused to dissolve additional expanded synthetic resin wastes in subsequent operations, as shown in step 172.

The novel process may be improved by steps such as straining or filtering contaminants from the solution prior to discharging solution for precipitation.

It is to be understood that the present invention is not limited to the embodiments described above, but encompasses any and all embodiments within the scope of the following claims.

We claim:

1. Apparatus for reclaiming expanded synthetic resin wastes, comprising:

a tank disposed to receive resin wastes and to dissolve the resin wasted in a solvent;

a precipitator including a precipitator housing, said precipitator connected to said tank by a conduit, said conduit terminating in a nozzle within said precipitator housing, said precipitator further comprising an evaporator, said evaporator including an endless belt located beneath said nozzle, said evaporator also including a heater disposed in a heat exchange relationship with said endless belt, said evaporator also including a blower to circulate air through said precipitator housing to precipitate dissolved resin wastes in the form of a thin film;

a rolling element for winding the film into a wound roll; and a fusing element disposed to fuse the wound roll into a solid mass.

2. The apparatus for reclaiming expanded synthetic resin wastes according to claim 1, further comprising a granulator disposed to receive wound rolls produced by said means for fusing the wound roll and to granulate the wound roll into granules.

3. The apparatus for reclaiming expanded synthetic resin wastes according to claim 1, further comprising a condenser disposed in heat exchange relationship with air being circulated over said endless belt.

4. The apparatus for reclaiming expanded synthetic resin wastes according to claim 3, said condenser comprising a vapor compression refrigeration machine having a chilling circuit disposed in heat exchange relationship with air being circulated over said endless belt.

5. The apparatus for reclaiming expanded synthetic wastes according to claim 1, further comprising a motor disposed to operate said endless belt and a variable speed drive disposed to control speed of said motor.

6. The apparatus for reclaiming expanded synthetic wastes according to claim 1, said fusing element comprising a roller having a source of heat, said roller disposed in rolling contact with a wound roll being formed on said rolling element.

* * * * *